(No Model.)

D. A. ARNOLD.
SAW SET.

No. 523,505. Patented July 24, 1894.

Witnesses
Chas. F. Schmid
Katie Farrell

Inventor
David A. Arnold,
By Attorney
John C. Dewey

UNITED STATES PATENT OFFICE.

DAVID A. ARNOLD, OF PAWTUCKET, RHODE ISLAND.

SAW-SET.

SPECIFICATION forming part of Letters Patent No. 523,505, dated July 24, 1894.

Application filed November 16, 1893. Serial No. 491,076. (No model.)

*To all whom it may concern:*

Be it known that I, DAVID A. ARNOLD, a citizen of the United States, residing at Pawtucket, in the county of Providence and State of Rhode Island, have invented certain new and useful Improvements in Saw-Sets; and I do hereby declare that the following is a full, clear, and exact description thereof, which, in connection with the drawings making a part of this specification, will enable others skilled in the art to which my invention belongs to make and use the same.

My invention relates to saw setting devices, and the object of my invention is to improve upon the construction of saw setting devices as now ordinarily made, and more particularly to make a saw setting device which in case of a saw thicker at one end than at the other, will set the saw equal the whole length, so that the teeth will be bent out the same distance at the thin end as at the thick, thus producing a saw in which the outer points of the teeth will all lie in two parallel lines from end to end of the saw, without regard to any difference in the thickness of the saw at either end.

My invention consists in certain novel features of construction of a saw setting device, in which the anvil has a movement parallel to the movement of the bending lever, so that when a saw is thinner at one end than at the other, the movable anvil will allow the bending die or lever to go down farther, so that the teeth at the thin end of the saw will be bent out the same distance as the teeth at the thick end of the saw, as will be hereinafter fully described.

Figure 1:
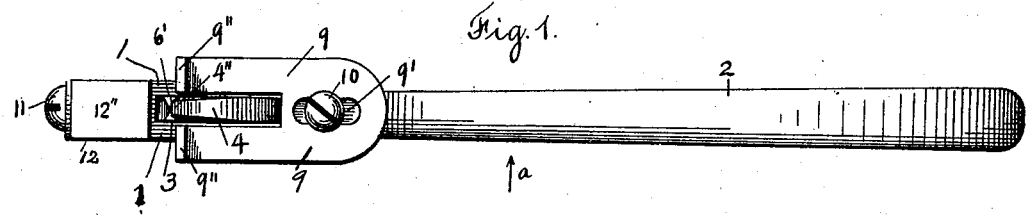
Figure 2:
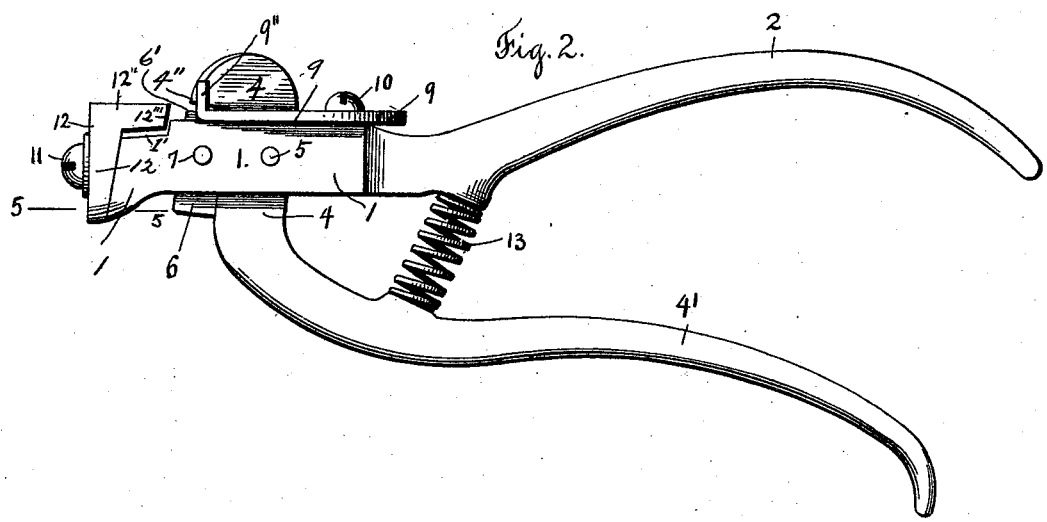
Figures 3, 4:
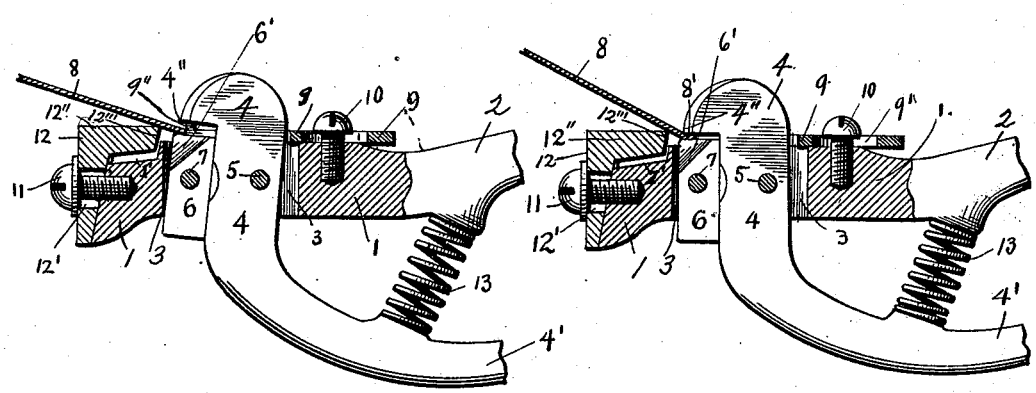
Figure 5:

Referring to the drawings: Figure 1 is a top view of a saw setting device, embodying my invention. Fig. 2 is a side view, looking in the direction of arrow $a$, Fig. 1. Fig. 3 is a sectional view showing the saw in position, preparatory to the setting or bending of a tooth. Fig. 4 corresponds to Fig. 3, but shows the opposite position of the anvil, and bending die or lever, after a tooth is set or bent. Fig. 5 is a sectional detail, on line 5, 5, Fig. 2, showing the manner of attaching the gage which regulates the set of the saw tooth.

In the accompanying drawings, Figs. 1 to 5 inclusive, 1 is the head of the device, and 2 the handle; the head 1 is provided with an elongated vertical aperture 3, through which extends the pivoted bending lever 4, which has a handle 4'.

The lever 4 is pivotally secured in the aperture 3, in the head 1, by a pin 5, and the front end or nose 4'' thereof, which engages and sets or bends the saw teeth, extends over the upper end of the anvil 6, which is also pivotally secured in the aperture 3, by a pin 7, and extends alongside of and parallel to the lever 4, with one edge in contact with one edge of said lever, see Figs. 1 and 2.

The upper front corner 6' of the anvil 6, on which a saw tooth 8' of the saw 8 rests, is preferably made tapering and narrower than the body of the anvil, see Fig. 1.

A gage 9 to regulate the length of the saw teeth to be set, is adjustably secured on the upper side of the head 1 by a screw 10 extending through a longitudinal slot 9' in said gage 9. The opposite end of the gage 9 is bifurcated, and the two parts thereof extend upon each side of the lever 4, and have upwardly extending ears 9'' at their ends, against which the ends of the saw teeth bear when the saw is in position, preparatory to the setting or bending of the teeth, as shown in Fig. 3. On the end of the head 1 is, in this instance, adjustably secured by a screw 11, a gage 12, which regulates the set of the saw teeth.

The gage is preferably connected with the end of the head 1 by a dovetail and groove, as shown in Fig. 5, and the gage is adjustable up or down on the end 1 by means of the screw 11 extending through a longitudinal vertical slot 12' in the gage 12.

The end of the head is preferably inclined slightly toward the upper end of the anvil and the gage is preferably made slightly wedge-shaped so that after it is set the pressure upon its upper surface by the saw when the lever is operated to set the tooth, will not move the gage down on the head and thus throw it out of adjustment.

The head is preferably provided with a notch or recess 1' and the gage is provided with a thin flat head 12'', which will fit within the recess. By making the head thicker than the depth of the notch the upper surface of the gage will normally be above the surface of the head, and substantially on a line with the top of the anvil, or slightly above it, so that for most ordinary work it will not be necessary to raise the head of the gage out of the notch. The edge of the gage adjacent the anvil is perfectly straight and as wide as the head, so as to give a good substantial bearing for the saw, and by slightly beveling or under cutting the end of the head, as at 12''', a very sharp edge is secured against which the saw is forced when the tooth is being set, thereby preventing any slipping of the saw which would change the angles of the different teeth.

A coil spring 13 is placed between the handle 2 and the handle 4' of the lever 4 and acts to move the handle 4' of said lever away from the handle 2, and also the nose 4'' away from the anvil 6, as shown in Fig. 3.

The operation of the saw setting device shown in Figs. 1 to 5 inclusive, embodying my invention, will be readily understood by those skilled in the art, from the above description in connection with the drawings.

The gage 9 is first properly adjusted according to the desired length of the saw teeth to be set or bent, and the gage 12 is properly adjusted according to the desired set of the saw teeth. The saw setting device is then applied to the toothed edge of the saw, as shown in Fig. 3, and the handles 2 and 4' grasped by the operator. The drawing of the handle 4' toward the handle 2 against the action of the spring 13, will cause the lever 4 to rock on its pivot pin 5, and the engaging end or nose 4'' thereof to move toward the top of the anvil 6, and engage the saw tooth 8' resting thereon. The movement of the lever 4 on its pivot pin, will cause the anvil 6 to move on its pivot pin 7 in a direction parallel to the direction of movement of the lever 4, so that the upper end 6' of the anvil 6 on which the saw tooth rests, will have a motion parallel to the motion of the engaging face of the end or nose 4'' of the lever 4, and said end 4'' in connection with the top 6' of the anvil 6 will set or bend the tooth 8' upwardly, as shown in Fig. 4.

By reason of the pivotal support of the anvil 6, and the movement of the end 6' thereof, parallel to the movement of the engaging face of the end or nose 4'' of the lever 4, said lever 4 and the operating end 4'' thereof will always move so as to set or bend the tooth the same distance throughout the length of the saw, without regard to whether one end of the saw blade is thicker or thinner than the other.

It will be understood that the details of construction of some of the parts of my invention may be varied if desired, and the essential feature thereof, the movement of the anvil in the same proportion to the movement of the operating end of the bending or setting lever, may be embodied in different forms of saw setting devices.

Having thus described my invention, what I claim as new, and desire to secure by Letters Patent, is—

1. In a saw set, the combination, with a handle, one end of which is provided with a head, of a lever pivotally secured thereto, a wedge-shaped gage adjustably secured to the head, and an anvil pivotally secured to the head between the gage and the end of the lever, substantially as set forth.

2. In a saw set, the combination, with a handle, one end of which is provided with a head, the outer end of which is inclined and provided with a screw-threaded opening, a longitudinally slotted wedge-shaped gage upon the end of the head, a set screw through the slot and into the screw-threaded opening, a lever pivotally secured to the handle, and an anvil pivotally secured between the gage and the end of the lever, substantially as set forth.

3. In a saw set, the combination, with a handle, one end of which is provided with a head, the upper surface of the head being notched or recessed, a substantially L-shaped gage adjustably secured upon the end of the head with a portion thereof within the recess in the top of the head, said portion being of a greater thickness than the depth of the notch, a lever pivotally secured to the head, and an anvil pivotally secured between the gage and the lever, substantially as set forth.

4. In a saw set, the combination, with a handle, one end of which is provided with a head, of a lever pivotally secured thereto, a gage adjustably secured to the head, a portion of which is undercut, whereby a straight sharp edge is formed adjacent to the lever, and an anvil pivotally secured between the gage and the end of the lever, substantially as set forth.

5. In a set saw, the combination, with a handle, one end of which is provided with a slotted head, a lever and an anvil pivotally secured within said slot, a gage at the outer end of the head, and a gage plate upon the upper flat surface of the head, each end of said plate being slotted and one end having its ends turned upward and arranged, one upon each side of the lever, and a set screw through the other end of the plate into the head of the handle, substantially as set forth,

DAVID A. ARNOLD.

Witnesses:
ISAAC SHOVE,
JAMES S. NEWELL.